United States Patent [19]

Castleman, Jr. et al.

[11] Patent Number: 5,466,430
[45] Date of Patent: Nov. 14, 1995

[54] METALLO-CARBOHEDRENES $M_8C_{12}$

[75] Inventors: Albert W. Castleman, Jr., State College; Baochuan Guo, University Park, both of Pa.

[73] Assignee: The Penn State Research Foundation, University Park, Pa.

[21] Appl. No.: 42,977

[22] Filed: Apr. 5, 1993

Related U.S. Application Data

[63] Continuation-in-part of Ser. No. 850,539, Mar. 13, 1992, abandoned.

[51] Int. Cl.$^6$ .................................................. C01B 31/00
[52] U.S. Cl. .................................................. 423/440
[58] Field of Search ............................ 423/440, 445 B, 423/439; 427/249

[56] References Cited

U.S. PATENT DOCUMENTS 4,707,384 11/1987 Schachner et al. .................... 427/249
4,919,974 4/1990 McCue et al. ......................... 427/249

OTHER PUBLICATIONS

Pradeep et al. "A Novel $F_eC_{60}$ in the Solid State," *J. Am. Chem. Soc.*, 174 (6) Mar. 11, 1992, pp. 2272–2273.
Huang et al. "Externally Bound Metal Ion Complexes of Bulkminsterfullerene, $MC_{60}$, in the Gas Phase", *J. Am. Chem. Soc.* 113(24) Nov. 20, 1991, pp. 9418–9419.
Massalski et al. *Binary Alloy Phase Diagrams*, vol. 1 American *Society for Metals* (1986) pp. 593–599, 603–604.
(no month).
Wei, et al., Science, vol. 256, pp. 818–820 (1992) no month.
Guo, et al., Science, vol. 255, pp. 1411–1413 (1992) no month.
Guo, et al., Science, vol. 256, pp. 515–516 (1992) no month.
Chen, et al., Journal of Physical Chemistry, vol. 96, No. 23, pp. 9581–9582 (1992).
Chen, et al., Chemical Physics Letters, vol. 198, No. 1, 2, pp. 118–122, (1992). no month.
Pennisi, Science News, vol. 141, pp. 50–251 (1992) no month.
Wei, et al., J. phys. Chem., vol. 96, pp. 4166–4168 (1992) no month.
Guo, et al., J. Chem. Phys., vol. 97, pp. 5243–5245 (1992).

*Primary Examiner*—Wayne Langel
*Assistant Examiner*—Stuart L. Hendrickson
*Attorney, Agent, or Firm*—Thomas J. Monahan

[57] ABSTRACT

Metallo-carbohedrene compositions, their method of manufacture and use are described. The metal component of the compositions is selected from the group of transition elements and preferably is titanium, zirconium, or vanadium. The compositions of the invention are molecular clusters in the ratio 8:12, metal to carbon respectively. A preferred embodiment is $Ti_8C_{12}$ which has a cage-like structure (suggested 12 pentagonal rings and each of the rings is formed by two titanium and three carbon atoms) where each titanium is bound to three carbons. The compositions of this invention represent a new class of stable molecules (metallo-carbohedrenes) having a variety of applications and are particularly useful as electronic materials and catalysts.

1 Claim, 12 Drawing Sheets

1

METALLO-CARBOHEDRENES $M_8C_{12}$

This is a continuation-in-part of application Ser. No. 07/850,539 filed on Mar. 13, 1992 now abandoned.

BACKGROUND OF THE INVENTION

The present invention relates to a new class of metal:carbon molecular structures known as metallo-carbohedrenes (Met-Cars), and preparation and characterization of same. These molecules have potentially a variety of applications including use as new electronic materials and as catalysts.

By way of background, the reported observation of the molecule $C_{60}$ [Kroto, H. W., et al., *Nature* 318, 162 (1985)] [Curl, R. F., et al., *Science* 242, 1017 (1988)] has prompted extensive activity in fullerenes and related carbon-cluster research [Weltner, Jr., W., et al., *Chem. Rev.* 89, 1713 (1989)] [Kroto, H. W., et al., *Chem. Rev.* 91, 1213 (1991)]. A group at AT&T Bell Laboratory reported the successful doping of alkali metal atoms into $C_{60}$ crystals to produce a new superconductive material [Hebard, A. F., et al., *Nature* 350, 600 (1991)]. Smalley and coworkers obtained evidence for the incorporation of lanthanum in the interior of $C_{60}$ [Chai, Y., et al., *J. Phys. Chem.* 95, 7564 (1991)], a structure which has been born out by more extensive studies. Also, other researchers have reported the ability to incorporate He+ within the fullerene ball [Weiske, T., et al., *Angew. Chem. Int. Ed. Engl.* 30, 884 (1991)] [Ross, M. M., et al., *J. Phys. Chem.* 95, 5720 (1991)]. In addition to the above doping, Smalley's group [Guo, T., et al., *J. Phys. Chem.* 95, 4948 (1991)] has found that a few carbon atoms in $C_{60}$ can be replaced by non-metal boron elements in the $C_{60}$ cage without substantially destabilizing the entire fullerene.

Currently, there is extensive interest in the prospect of producing new materials comprised of molecular clusters. This is evidenced by the explosive research on $C_{60}$. Interest in these materials has arisen due to the fact that molecular clusters often display unique physical and chemical properties unlike those of other forms of matter.

We discovered a remarkably stable cluster $Ti_8C_{12}^+$ (C. Guo, K. P. Kerns, and A. W. Castleman, Jr., *Science* 255, 1411, 1992) and postulated that its extraordinary stability was due to geometric and electronic properties inherent in a cage-like, suggested dodecahedral structure. Furthermore, we suggested that this molecule might be just one member of a new general class of molecular clusters named as metallo-carbohedrenes or Met-Cars which involve possible incorporation of early transition metals with carbon to construct a cage like-structure. Thereafter, our subsequent work confirmed this speculation and revealed that other early transition metals such as vanadium, zirconium, and hafnium can form similar stable metallo-carbohedrenes, $M_8C_{12}$, as well (B.C. Guo, S. Wei, J. Purnell, S. Buzza, and A. W. Castleman, Jr., *Science*, 256, 515, 1992 and S. Wei, B.C. Guo, J. Purnell, S. Buzza, and A. W. Castleman, Jr., *J. Phys. Chem.*, 96, 4166, 1992)

The observation of Met-Cars and their proposed structure has received favorable response from the chemistry, physics, and materials science communities. Just a few months after our first report on Met-Cars, intensive theoretical investigations to verify our findings were made by a number of research groups [B. V. Reddy, S. N. Khanna, and P. Jena, *Science*, 258 1640 (1992), R. W. Grimes, and J. D. Gale, *J. Chem. Soc., Commun.*, 1222, 1992, Z. Lin, and M. B. Hall, 65 *J. Am. Chem. Soc* 114, 10054 (1992). B. V. Reddy, S. N. Khanna, and P. Jena, *Science*, 258 1640 (1992). R. W. Grimes, and J. D. Gale, *J. Chem. Soc., Commun.*, 1222, 1992.., Z. Lin, and M. B. Hall, *J. Am. Chem. Soc* 114, 10054 (1992)., M. M. Rohmer, P. De Vaal, and M. Benard, *J. Am. Chem. Soc.* 114, 9696 (1992), M. Methfessel, M. van Schilfgaarde, and M. Scheffer, *Phys. Rev. Lett.* 70, 29 (1992), A. Ceulemans, and P. W. Fowler, *J. Chem. Soc. Faraday Trans.*, 88, 2797 (1992), L. Pauling, *Proc. Natl. Acad. Sci.*, 89, 8175 (1992). These calculations suggested that Met-Cars with a cage-like structure are indeed very stable and that they are assembled by a framework comprised of metal-carbon and carbon-carbon bonds.

The main difference between Met-Cars and the well-known buckyball $C_{60}$ is that the structure of Met-Cars is constructed with metal-carbon and carbon-carbon bonds, while that of $C_{60}$ is built with only carbon-carbon bonds. In view of this difference, it is considered likely that Met-Cars will display significantly different chemical properties from those of $C_{60}$.

This novel kind cage-like molecules which we term metallo-carbohedrenes, in which a number of metal atoms incorporate with carbons to form a symmetrical network, have not been described heretofore.

SUMMARY OF THE INVENTION

In accordance with the present invention, new metal-carbon compositions and methods related thereto, are presented. Stable suggested dodecahedral molecular configurations involving transition elements and carbon at a ratio of 8:12 are described and referred to as metallo-carbohedrenes. The cage-like structures of the invention are believed to have 12 pentagonal rings, each of which consists of two metal and three carbon atoms, wherein each metal atom is bound to three carbons. Such metallo-carbocage molecules are a new class of molecules (metallo-carbohedrenes). A preferred embodiment of the invention is $Ti_8C_{12}$. In addition to titanium, the transition elements zirconium, hafnium and vanadium can preferably serve as the metal components of the metallo-carbohedrenes of the invention. The compositions of the invention are potentially particularly useful as catalysts and new electronic materials.

Macroscopic quantities of the metallo-carbohedrenes $Ti_8C_{12}$ and $V_8C_{12}$ have been synthesized using an arc discharge technique. Mass spectroscopy of raw soot samples generated in both an ac and dc arc between two metal/graphite powder composite electrodes establishes that the titanium and vanadium analogs of the metallo-carbohedrenes have been produced. An estimated yield of approximately 1% is obtained, and significantly, the Met-Cars are found to be stable in air.

OBJECTS OF THE INVENTION

An object of this invention is to develop new stable materials of metal and carbon characterized by a cage-like structure.

It is also an object of the invention to develop novel stable metallo-carbohedral cage-like molecules where the metal can be vanadium, zirconium, hafnium, titanium but also molybdenum, iron, chromium and other transition metals.

Another object of this invention is to provide the stable metallo-carbohedrene moleculer $Ti_8C_{12}$.

These and other objects and advantages of the invention over the prior art and a better understanding of its use will become readily apparent from the following description and are particularly delineated in the appended claims.

DETAILED DESCRIPTION OF THE INVENTION

The present invention describes a new class of cage-like molecular clusters, namely metallo-carbohedrenes, as well as method of production of the said compounds.

EVIDENCE OF METALLO-CARBOHEDRENES PRODUCTION

The present invention describes the first evidence of a new class of cage-like molecular clusters, namely metallo-carbohedrenes. During the course of detailed studies involving the investigation of dehydrogenation reactions of hydrocarbons induced by metal ions, atoms, and clusters, we initially developed an unusually abundant and stable molecular species with a molecular weight of 528 amu, which we established as containing 8 titanium atoms and 12 carbons. The support for these new findings and a suggested structure (c.f., see FIG. 1) for various embodiments are the subject of the present invention.

A detailed embodiment of the present metallo-carbohedrene invention involving titanium and carbon is herein disclosed. However, it is understood that the disclosed preferred embodiment is merely illustrative of the invention which may be embodied in various forms with various other transition metals (e.g., titanium, vanadium, and zirconium, but not limited to these) and carbon. Accordingly, specific structural and functional details disclosed herein are not to be interpreted as limiting, but merely as support for the invention as claimed and as appropriate representation for teaching one skilled in the art to variously employ the present invention in any appropriate embodiment.

The experimental method employed in the present invention is based on our newly-developed MS/MS system described in the experimental section. The new molecular clusters which we describe here were generated through reactions of transition elements (i.e., titanium, zirconium, vanadium) with any of the following vapors: $CH_4$, $C_2H_2$, $C_2H_4$, $C_3H_6$, or $C_6H_6$.

Figure 1:
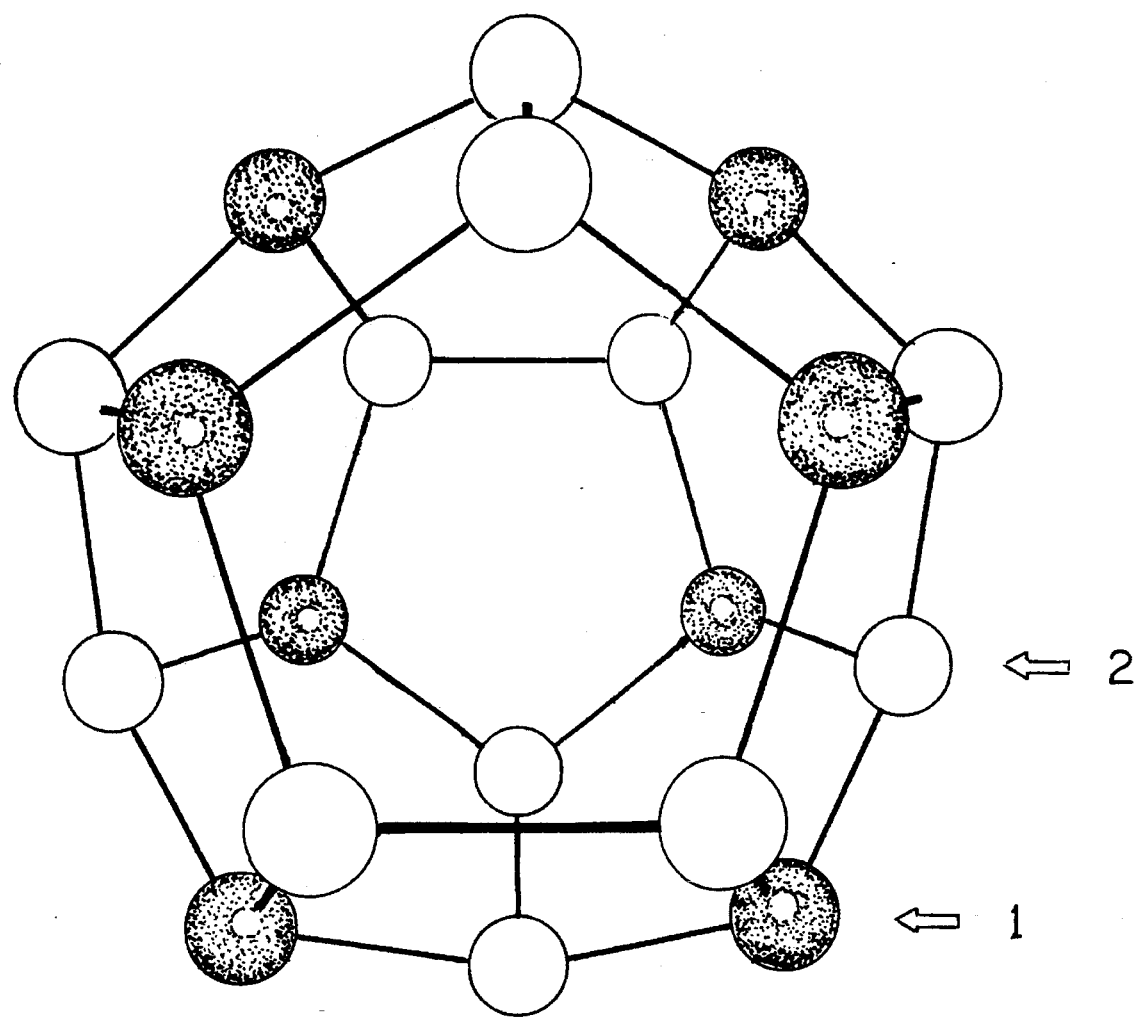
FIG. 1 presents an idealized structural configuration of the metallo-carbohedrene compositions of the invention.

Referring to the drawings in more detail, FIG. 1 shows the suggested structure for the metallo-carbododecahedral compositions of the invention. Numeral 1 of FIG. 1 is one of the metal components (i.e., titanium atom) of the composition and Numeral 2 of FIG. 1 is one of the carbon atoms.

Figure 2:
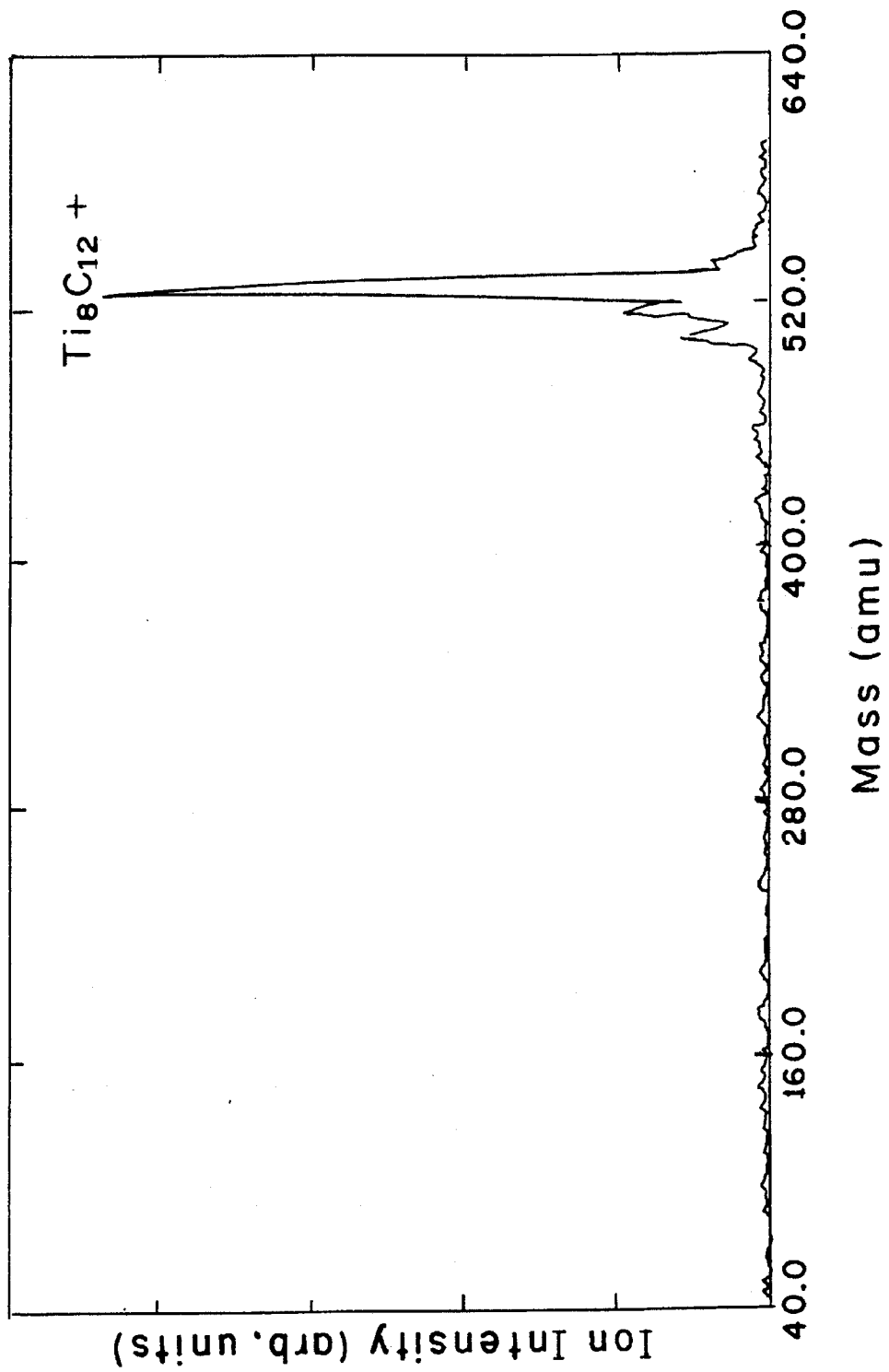
FIG. 2 shows a mass spectrum of molecular configuration, containing titanium metal atoms and carbon atoms formed from reaction of titanium with methane.
Figure 3:
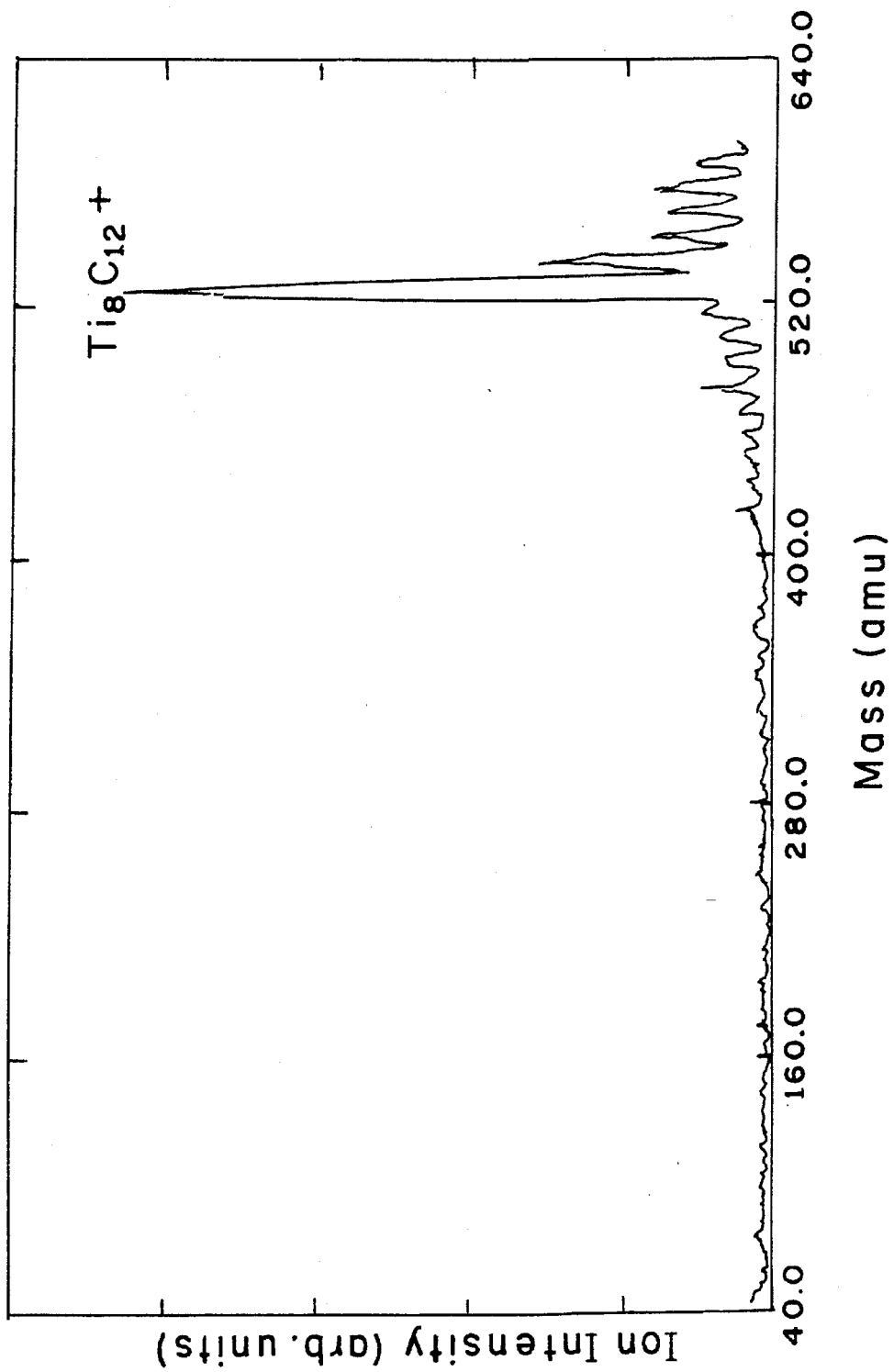
FIG. 3 shows a mass spectrum of molecular configurations containing titanium metal atoms and carbon atoms formed from reaction of titanium with acetylene.

FIGS. 2 and 3 show a mass spectra of clusters containing titanium metal atoms and carbons formed from reactions of titanium with two of the five different hydrocarbon molecules used to produce metallo-carbohedrenes. The spectrum of FIG. 2 was obtained using methane. The spectrum of FIG. 3 was obtained using acetylene. As seen from FIGS. 2 and 3, a peak at 528 amu is totally dominant ("super magic") in both mass spectra. No other prominent peaks are observed in the mass range below 1200 amu. Reactions with ethylene, benzene or propylene generate similar cluster distributions.

In order to definitively establish the identify of this unusually stable species, we undertook a series of studies with hydrocarbons of varying isotopic composition. Isotope labeling experiments with deuterium show that the clusters corresponding to the "super magic" peak do not contain any hydrogen atoms, while $^{13}C$ labeling establishes that the cluster accommodates exactly 12 carbon atoms. Therefore, the magic peak was assigned as $Ti_8C_{12}^+$ based on the mass and isotope labeling experiments. Furthermore, high resolution isotope distribution pattern analyses support the assignment of 8 Ti atoms as well.

In order to provide supporting evidence for the proposed structure, we have conducted experiments to "titrate" the metal atoms which are available for bonding. The $Ti_8C_{12}^+$ molecular cluster was mass selected and injected into the thermal reaction cell containing $NH_3$. Importantly, the species accommodates 8 ammonia molecules, one for each Ti site. This finding shows that the titaniums are exposed at the cluster surface, and indicates that they are identically coordinated. This is strong evidence for the proposed dodecahedral structure.

Other clusters such as $Ti_7C_{13}^+$, $Ti_6C_{14}^+$ and so on can also form a cage-like suggested dodecahedral structure, but replacement of titaniums by carbons would be expected to destroy this structure of high symmetry. In turn, this would necessitate the direct connection of at least three of the suggested pentagonal rings, each of which would have only one metal, or less. It is unlikely that one metal atom can sufficiently reduce the strain of the pentagonal rings to stabilize the cluster. Therefore, in the reactor such clusters would undergo further reactions with hydrocarbons to form more stable products (such as $Ti_8C_{12}^+$), thereby leading to a reduction in their abundance. In accordance with our findings, $Ti_8C_{12}^+$ would be expected to survive in the reactor once formed. If one considered that $Ti_8C_{12}^+$ does not have a dodecahedral structure, the cluster would have many dangling bonds at the edges and it would be much more reactive with other species in the reactor than observed. Consequently, such a $Ti_8C_{12}^+$ species would not be expected to display the "super magic" peak shown in FIGS. 2 and 3.

PRODUCTION OF METALLO-CARBOHEDRENES IN THE SOLID STATE

Following the initial discovery of these metallo-carbohedrenes we pursued a means by which to prepare macroscopic quantities of the Met-Cars. Our investigation progressed with inspiration from the now well-known fullerene example (D. K. Bohme, Chem. Rev. 92, 1487, 1992, Q. L. Zhang, S. C. O'Brient, J. R. Heath, Y. Liu, R. F. Curl, H. W. Kroto and R. E.. Smalley, J. Phys. Chem. 90, 525, 1986) and our finding that Met-Cars can be produced in the gas phase, not only by hydrocarbon-metal reactions in a plasma, but also from the supersonic expansion of laser ablated titanium and graphite powders (Z. Y. Chen, et al., J. Phys. Chem. 96, 9581 (1992)). Herein, we report the successful bulk production of these intriguing molecular clusters in the solid state.

The production method relies on a modification of the common arc-discharge technique employed in the production of fullerenes (Handbook of Chemistry and Physics, 71st Edition, CRC Press, Boca Raton, 1990). Within the discharge reaction chamber, through which He flows, an arc resulting in a plasma is generated at approximately 70 V ac between a sharpened cathode and the anode. As the electrodes are consumed, they are kept at a distance no greater than 4 mm and the current is typically about 20 A. However, we have also produced the Met-Cars employing dc voltages and higher currents. The 6 mm diameter metal/graphite composite electrodes are pressed in a hardened steel dye under a force approaching 20,000 pounds and are affixed to machined graphite holders by means of graphite cement (Dylon Industries, GC grade). Prior to use these are baked at 150° C. for up to 4 hours. We have been successful in producing metallo-carbohedrenes from composite electrodes over a range of compositions, with those richer in carbon yielding fullerenes as well. After the plasma arc is terminated, the deposited black soot is gently scraped off the cooled collecting surfaces of the vessel and stored in air.

A critical aspect in reporting our successful synthesis of Met-Cars is establishing the existence of macroscopic quantities in the solid state. Subsequent to removal from the reactor, a portion of the soot is packed into a boron nitride laser desorption sample holder and analyzed via laser desorption time-of-flight mass spectrometry (TOF-MS). Briefly, the method is as follows. A desorption laser (Nd:YAG second harmonic), kept at a low power (<15 mJ/pulse), is loosely focused onto the sample supported directly behind the time-of-flight acceleration lens. Following desorption, the potentials on the TOF lens are pulsed so that the desorbed ions are accelerated into a field-free region. The ions are subsequently collected by a multichannel plate detector and the signal is averaged and stored using a digital oscilloscope. Proper timing of the high voltage pulses applied to the acceleration grids following laser desorption is critical. The spectrometer is calibrated using various known samples containing $C_{60}$ and $C_{70}$, and the laser desorption technique is found to be a sensitive analytical method. However, because all the ions within the TOF lens are accelerated simultaneously, the method lends itself to only moderate resolution.

Figure 4:
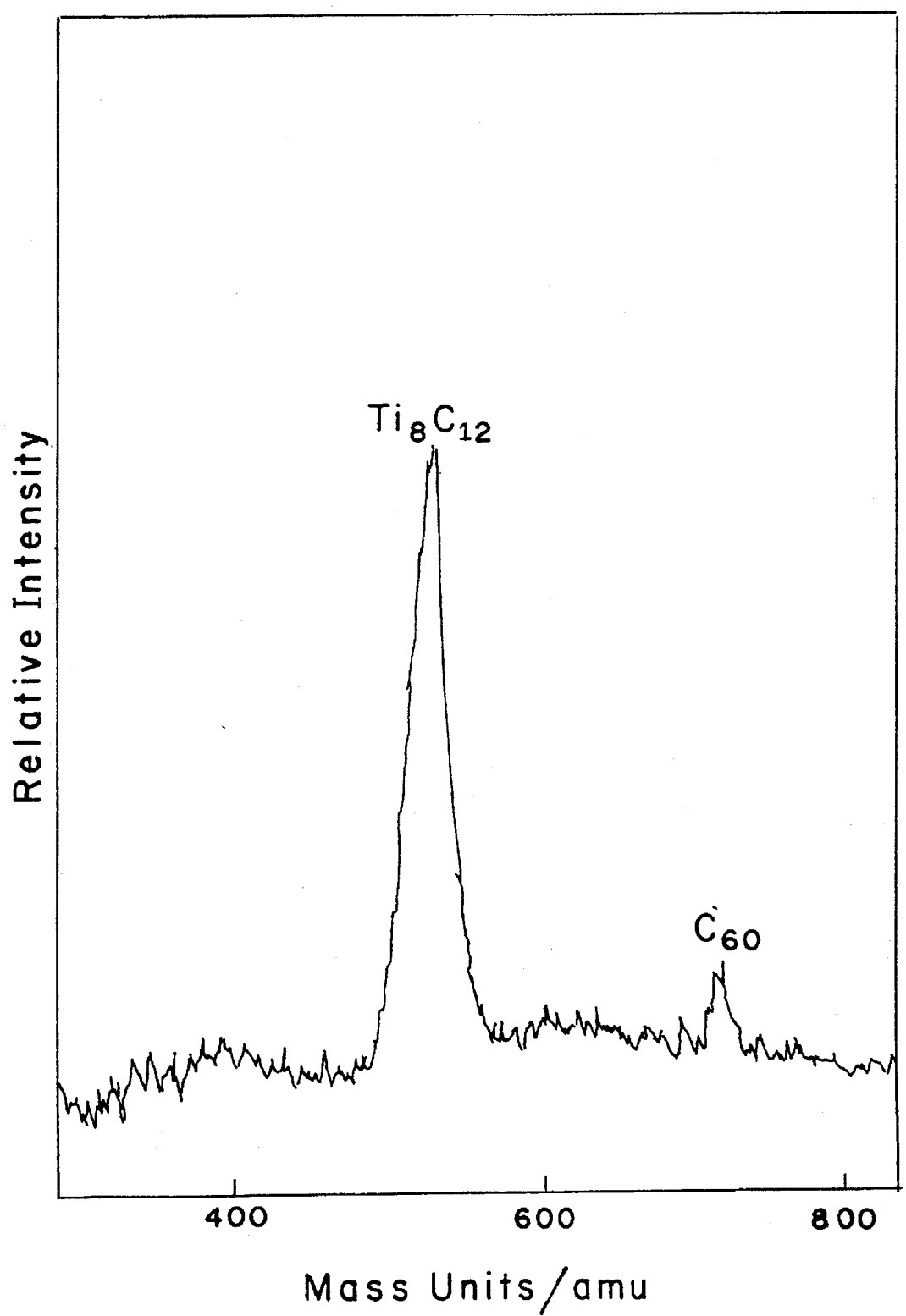
FIG. 4 is a laser desorption time-of-flight mass spectrum of soot generated in an arc between two composite Ti/C electrodes; 300–800 amu mass range. The Met-Car $Ti_8C_{12}$ and, to a lesser extent, $C_{60}$ are both present.
Figure 5:
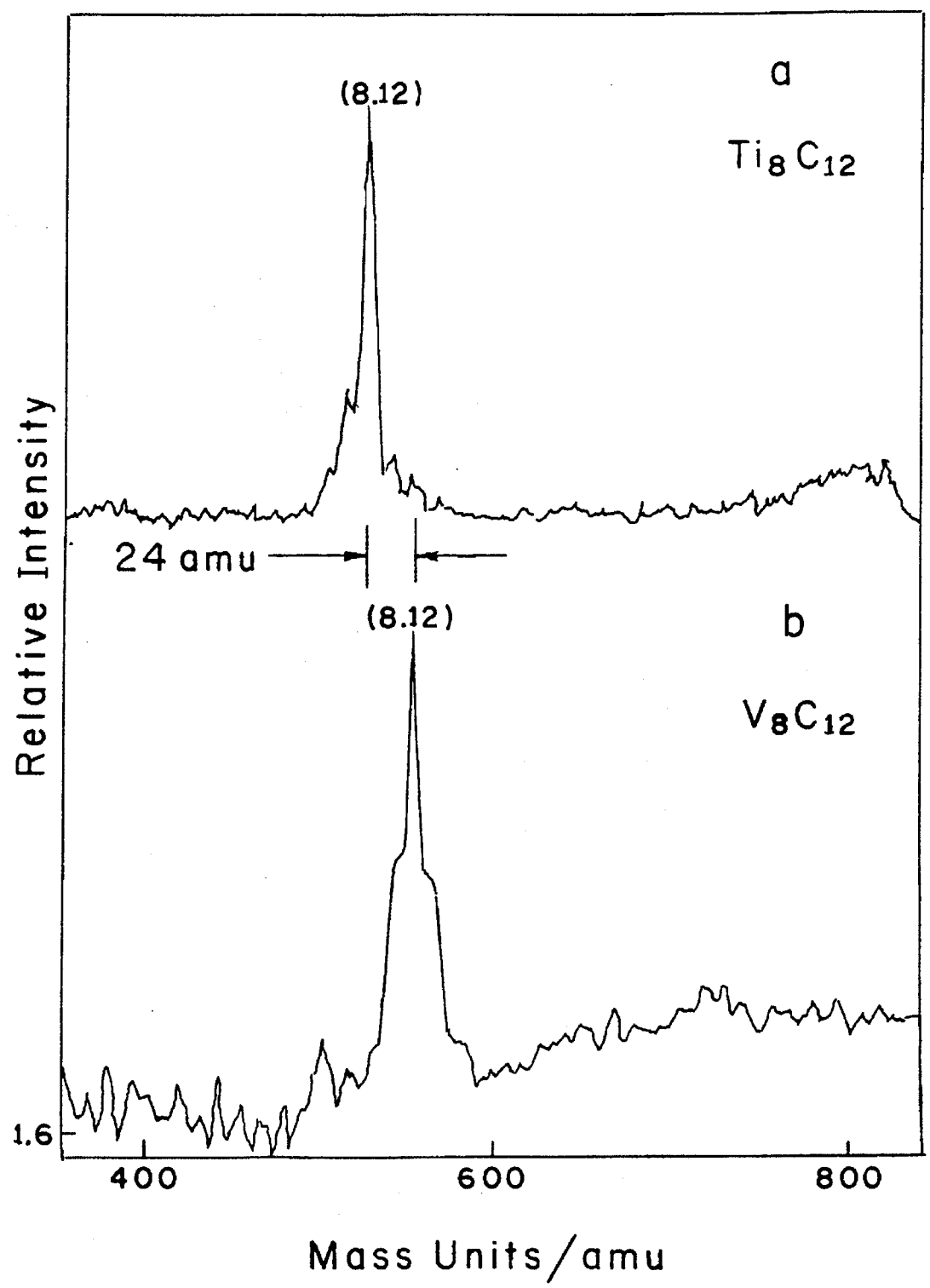
FIG. 5 is a mass spectrum of laser desorbed soot produced in an arc-discharge: (a) Ti/C, (b) V/C. Note the 24 amu shift between $Ti_8C_{12}$ and $V_8C_{12}$.
Figure 6:
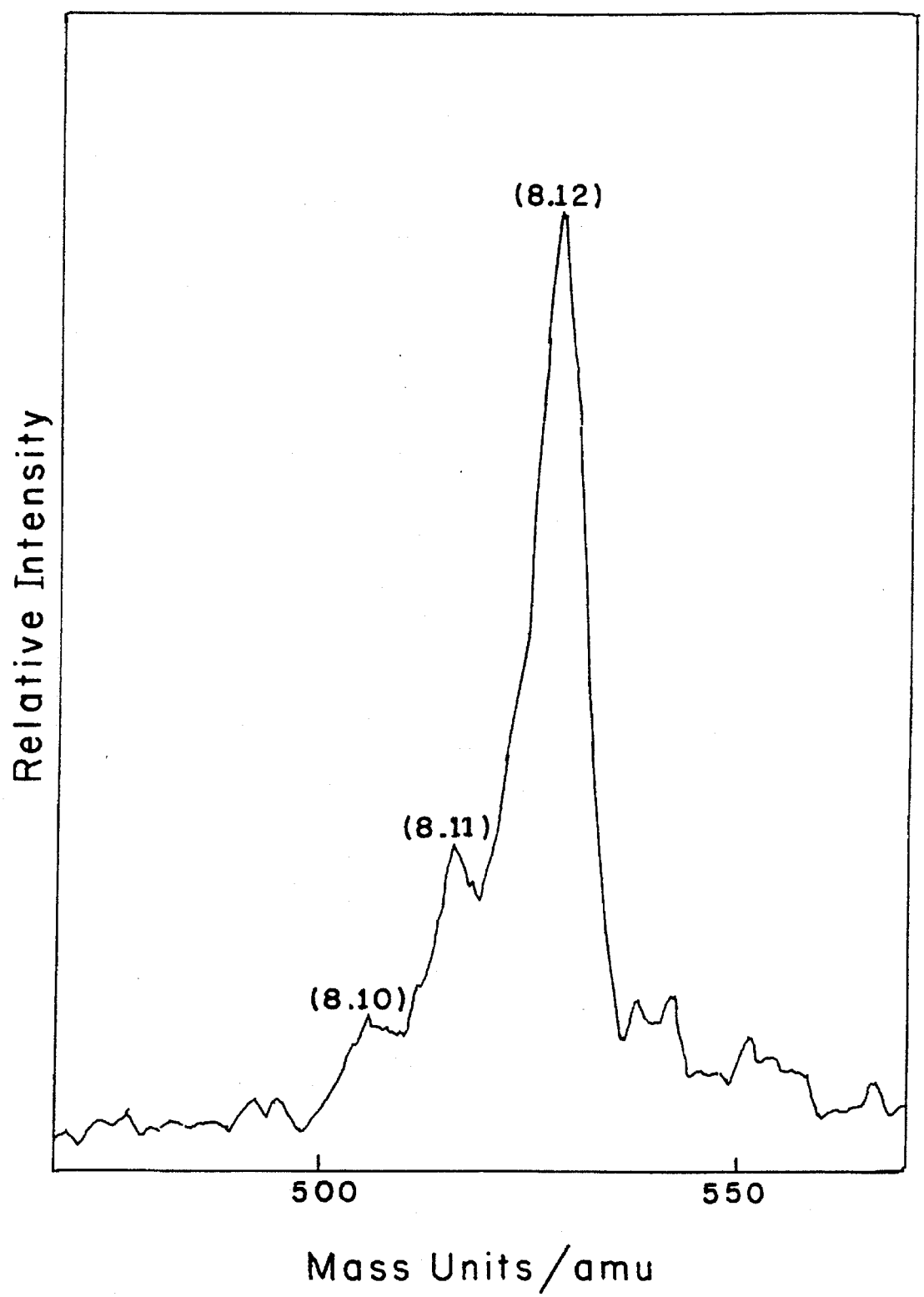
FIG. 6 is an expanded view of $Ti_8C_{12}$ spectrum shown in FIG. 2(part a). The shoulders on the dominant $Ti_8C_{12}$ peak are assignable as the fragments $Ti_8C_{11}$ and $Ti_8C_{10}$ produced during the desorption.

FIG. 4 shows the result of the mass spectrometric analysis of one sample of raw soot. This soot sample was produced from a discharge between titanium (–325 Mesh, 99%, Aesar)/graphite (1–2µ, Aldrich) composite electrodes and clearly shows the presence of both $Ti_8C_{12}$ and $C_{60}$. Even though $C_{60}$, and less often $C_{70}$, are inconsistently present in our various soot samples, in the low mass range, i.e. <150 amu, our spectra are consistently reproducible and display peaks assignable to the pure metal, metal oxides and metal-carbon species depending upon the system. FIG. 5 is the 400 to 800 amu mass range of the mass spectrum of soot produced in the manner described above. Significantly, in the mass range from 300 to 1500 amu, only one peak is observed; it appears at 528 amu. This peak corresponds to the mass of the Met-Car $Ti_8C_{12}$. In the expanded view of this spectrum shown in FIG. 6, the designated shoulders are at masses 504 amu and 516 amu which correspond to the $Ti_8C_{11}$ and $Ti_8C_{10}$ fragments of $Ti_8C_{12}$.

In order to confirm our successful production of Met-Cars, we also generated a soot sample from vanadium (–325 mesh, 99.5%, Aesar)/graphite composite electrodes, and analyzed it in the same manner. The results are shown in FIG. 5. There is an obvious mass spectral shift of 24 amu from 528 to 552 amu, establishing the presence of the vanadium analogue of the Met-Car, $V_8C_{12}$, in the sample. Moreover, we can assign the masses 540 amu and 564 amu to the species $V_8Cl_{11}$ and $V_8C_{13}$, respectively. This is significant as these species are also observed in molecular beam studies of the vanadium derivatives of the metallo-carbohedrenes.

Throughout this investigation we have made several particularly significant observations. First, our Met-Car containing soot samples are stable in air. This is an important clue to the electronic nature of these clusters as well as an affirmation of their predicted stability. Secondly, our soot samples are inhomogeneous and $C_{60}$, and to a lesser extent $C_{70}$, are, not surprisingly, commonly present in our soot. We estimate our Met-Car yield to be approximately 1%.

In considering the results of our analyses, we are certain that we are actually desorbing Met-Cars from the raw soot. It is highly unlikely that we would produce $M_8C_{12}$ (M=Ti,V) within the sample upon desorption as there are comparatively few collisions above the surface relative to the number of collisions in the plasma of either the laser vaporization source employed in the molecular beam experiments or of the arc discharge used to produce the species in the present work. Moreover, if the Met-Cars were generated during analysis, we would expect to see their characteristic building pattern as is observed in the molecular beam experiments. We see no evidence of this growth mechanism occurring in the desorption plume. Also, if this were the case we would expect to see $M_8C_{12}$ from a mixed sample of pure metal and graphite powders studied over a wide range of desorption laser powers; we have not seen any masses corresponding to Met-Cars in these test experiments. We are also certain that we are not merely fragmenting $C_{60}$ to smaller fullerenes which have mass coincidences with $Ti_8C_{12}$ ($C_{44}$) and $V_8C_{12}$ ($C_{46}$). Besides the fact that no other fragments are observed, it is highly unlikely that $C_{44}$ would be the most abundant fragment from the Ti/C soot with $C_{46}$ then being the most abundant in the V/C soot. Finally, upon heating the Met-Car containing soot samples at very high temperatures, we are able to eliminate the Met-Car mass signal which conclusively establishes its presence in the original soot.

The ability to produce metallo-carbohedrenes on a large scale is important to the fields of chemistry, physics and materials science. As these molecules have stimulated much interest among theoreticians and have been predicted to have novel structural, electronic and magnetic properties, their large-scale synthesis is an important step towards enabling scientists to investigate the properties of this unique class of compounds.

EXAMPLE 1

As an example of the production of $Ti_8C_{12}$ corresponding to the sample analyzed and displayed in FIG. 4, production was accomplished as follows. The electrodes, whose preparation was described above, were prepared with a 5 to 1 titanium to carbon mass ratio. The powders were intimately mixed and pressed with a total force of 20,000 pounds and then baked for four hours at 150° C. The cathode electrode was sharpened and the electrodes were installed as described above. A plasma arc was struck at 70 volts between the electrodes whose distance was 4 mm. The operating current was around 20 amp. The arc discharge was maintained for approximately 4 hours at a helium pressure of 500 psi. After the discharge was terminated, the vessel was cooled to room temperature and subsequently opened and the material carefully scrapped from the walls of the plasma arc reactor.

REACTIVITIES OF $Ti_8C_{12}^+$ AT THERMAL ENERGIES

Reactivities of the Met-Car $Ti_8C_{12}^+$ toward various molecules have been examined at thermal energies employing a selected drift tube reactor coupled with a laser induced plasma source. It is observed that this cluster ion is quite reactive toward molecules with either large dipole moments or ones with π-bonding systems. At room temperature $Ti_8C_{12}^+$ is found to take up 8 polar molecules, but only 4 molecules with π-bonding systems. Unlike the free radical ions $Ti^+$ and $C^+$, the Met-Car cluster ion reactions are observed to proceed mainly through association mechanisms leading to ligand attachment rather than ones that involve the breaking and forming of new chemical bonds. In addition, $Ti_8C_{12}^+$ is seen to be inert even toward oxygen, which is known to be a good free radical scavenger. The association or attachment behavior of $Ti_8C_{12}^+$ reactions is explained in terms of a closed or edgeless structure of the Met-Car and the presence of titaniums in the framework of $Ti_8C_{12}^+$. Hence, the observed reactivities of $Ti_8C_{12}^+$ provide further evidence supporting the argument that the Met-Car $Ti_8C_{12}$ has a cage-like suggested dodecahedral structure without dangling bonds.

The experimental apparatus employed in the present work is a selected ion drift tube reactor (SIDT) coupled with a laser vaporization source.

Briefly, SIDT consists of four main parts. The first one is a laser vaporization source. Here, we employed a laser induced plasma reaction technique to generate titanium-carbon cluster cations (B.C. Guo, S. Wei, Z. Chen, J. Purnell, S. Buzza, K. P. Kerns, and A. W. Castleman, Jr., *J. Chem. Phys.* 97, 5243, 1992). After production, the titanium-carbon cluster cation beam passes through a skimmer of 0.3 cm diameter, and then is focused and steered by the first group of three-element electrical ion lenses, and horizontal and vertical deflector plates, into the second part of the apparatus for mass selection via a quadrupole mass spectrometer. The function of this part is to select a specific size of cluster from a wide cluster distribution for the study of its reactivities. In the present work, $Ti_8C_{12}^+$ is selected by the first quadrupole mass spectrometer.

The selected $Ti_8C_{12}^+$ is refocused and adjusted by a second group of ion lenses and deflectors, and then injected into the third part of the apparatus which is a drift tube reactor where reactions between $Ti_8C_{12}^+$ and reactant occur. The drift tube reactor is comprised of a cylindrical copper tube which is 2.9 cm long with a 9 cm inside diameter, and a pair of stainless steel plates which function as the entrance and exit plates; these each have a 1.0 mm diameter orifice. The pressure in the reactor is measured by a capacitance manometer; typical pressures are about 0.7 torr with helium as the buffer gas. After undergoing thousands of collisions with buffer and reactant gases, a small fraction of selected ions, along with the product ions, diffuse through the exit orifice and into the high-vacuum chamber where a third group of ion lenses and deflectors focus and steer them into the fourth part of the machine. The fourth part contains the second quadrupole mass spectrometer affixed with a Channeltron electron multiplier (CEM). The final ion distribution is analyzed by the quadrupole mass spectrometer and detected by a CEM. The present experiments were conducted at room temperature. Hence, the reported results are the reaction behavior of $Ti_8C_{12}^+$ at thermal energies corresponding to room temperature.

REACTIONS WITH POLAR MOLECULES

As shown in what follows, $Ti_8C_{12}^+$ is very reactive toward the polar molecules $CH_3OH$, $H_2O$, and $ND_3$ studied in the present work at thermal energies. Measurement of the rate constants of polar molecule attachments to Met-Cars will be the subject of another paper. However, it is worthy of note that the rates have been found to proceed at surprisingly high values, near the collision rate in the case of all three ligands. FIG. 7 displays the product distribution from reactions of $Ti_8C_{12}^+$ with methanol at a very low partial pressure of methanol in the reactor. The total reactor pressure is about 0.7 torr. In the spectrum, the main peaks corresponding to products from the nth reaction step are labeled by an integer and indicate products which contain only methanol. Owing to water impurity in the sample or the buffer gas of helium, some minor peaks containing water also appear in the spectrum. These peaks are labeled by *. It is observed that the main reaction channels in both the primary and sequential reaction steps involve the attachment or association of methanols onto $Ti_8C_{12}^+$. The multiple-step attachment processes of polar molecules onto $Ti_8C_{12}^+$ can be expressed by following reactions:

$$Ti_8C_{12}^+(P)_{n-1} + P = Ti_8C_{12}^+(P)_n \quad (1)$$

where P is a polar molecule.

Most importantly, it is seen from FIG. 7 that sequential reactions terminate at the eighth reaction step. This result suggests that only 8 methanol molecules can bond to the first solvation shell of $Ti_8C_{12}^+$ at room temperature. In other words, the first solvation shell of this cluster ion can accommodate 8 methanols. In order to prove this point, we increased the partial pressure of methanol by more than one order of magnitude to see whether sequential reactions could result in further attachment of methanol molecules onto this cluster ion. The mass spectrum of FIG. 7 (part b) reveals the effect of an increase in methanol pressure on the product distribution. This spectrum was obtained under conditions of a high methanol partial pressure. Obviously, the product distribution is still truncated at the eighth step, and the effect of an increase in the methanol pressure leads only to a conversion of the products formed from the first seven reaction steps into $Ti_8C_{12}^+(CH_3OH)_8$. Hence, it is found that only 8 methanol molecules can bond onto the first solvation shell of $Ti_8C_{12}^+$. In the same way, we also found that the first solvation shell of this cluster ion only takes up, individually, 8 water or 8 ammonia molecules as demonstrated in FIG. 7, part a and b, respectively. Hence, $n \leq 8$ in equation (1).

In order to ascertain whether the reactions with those molecules involve any dehydrogenation processes, we carefully examined the product distribution of the reactions with $ND_3$ using high resolution mass spectra. It was found that the reactions only lead to the attachment of ammonia molecules and no dehydrogenation products were observed at thermal energies.

REACTIONS WITH BENZENE AND ETHYLENE

Figure 8A:
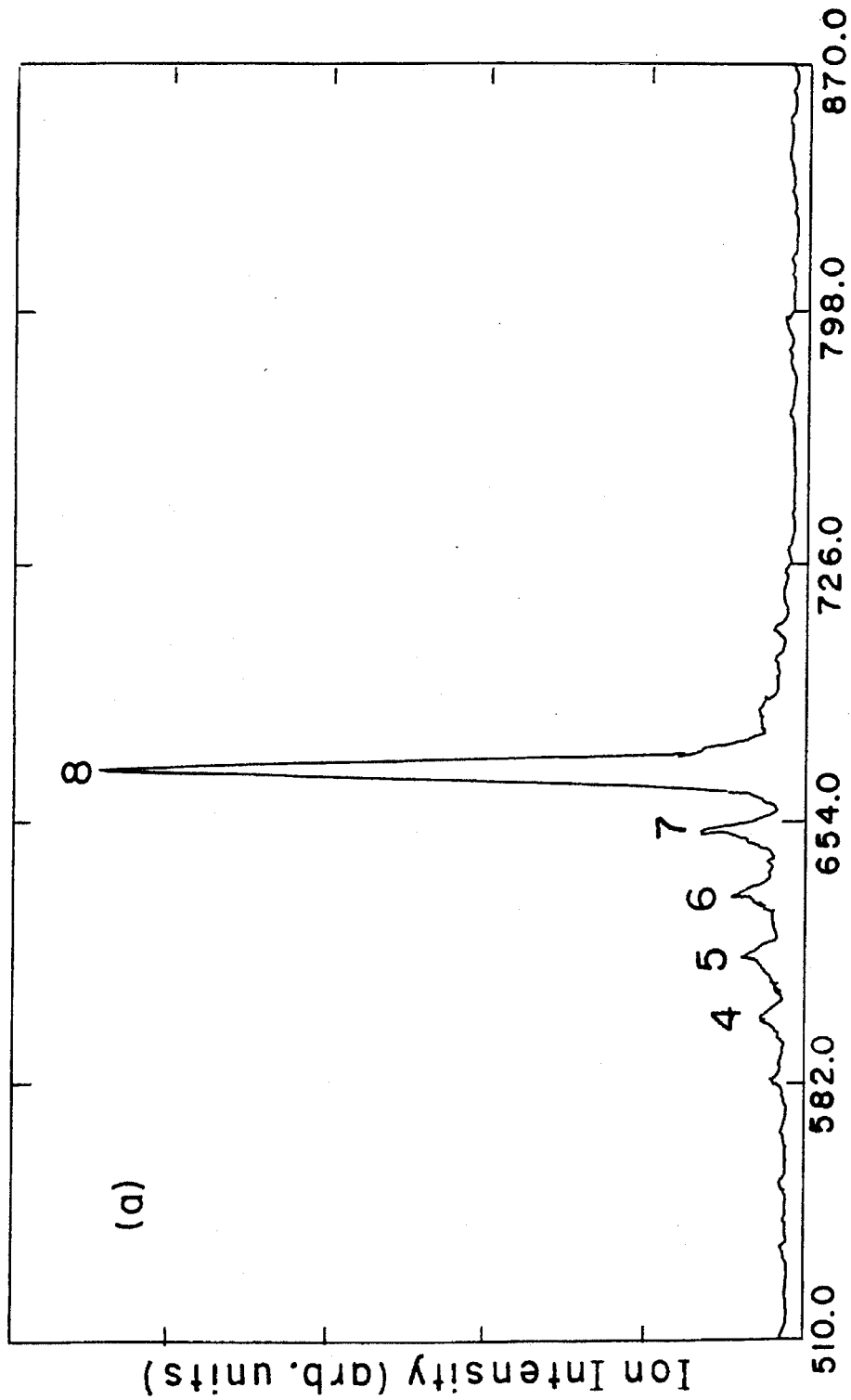
FIG. 8a is a mass spectrum of products arising from reactions of $Ti_8C_{12}^+$ with $H_2O$. The number indicates the number of $H_2O$ associating onto $Ti_8C_{12}^+$. Note that association reactions terminate at the eighth step.
Figure 8B:
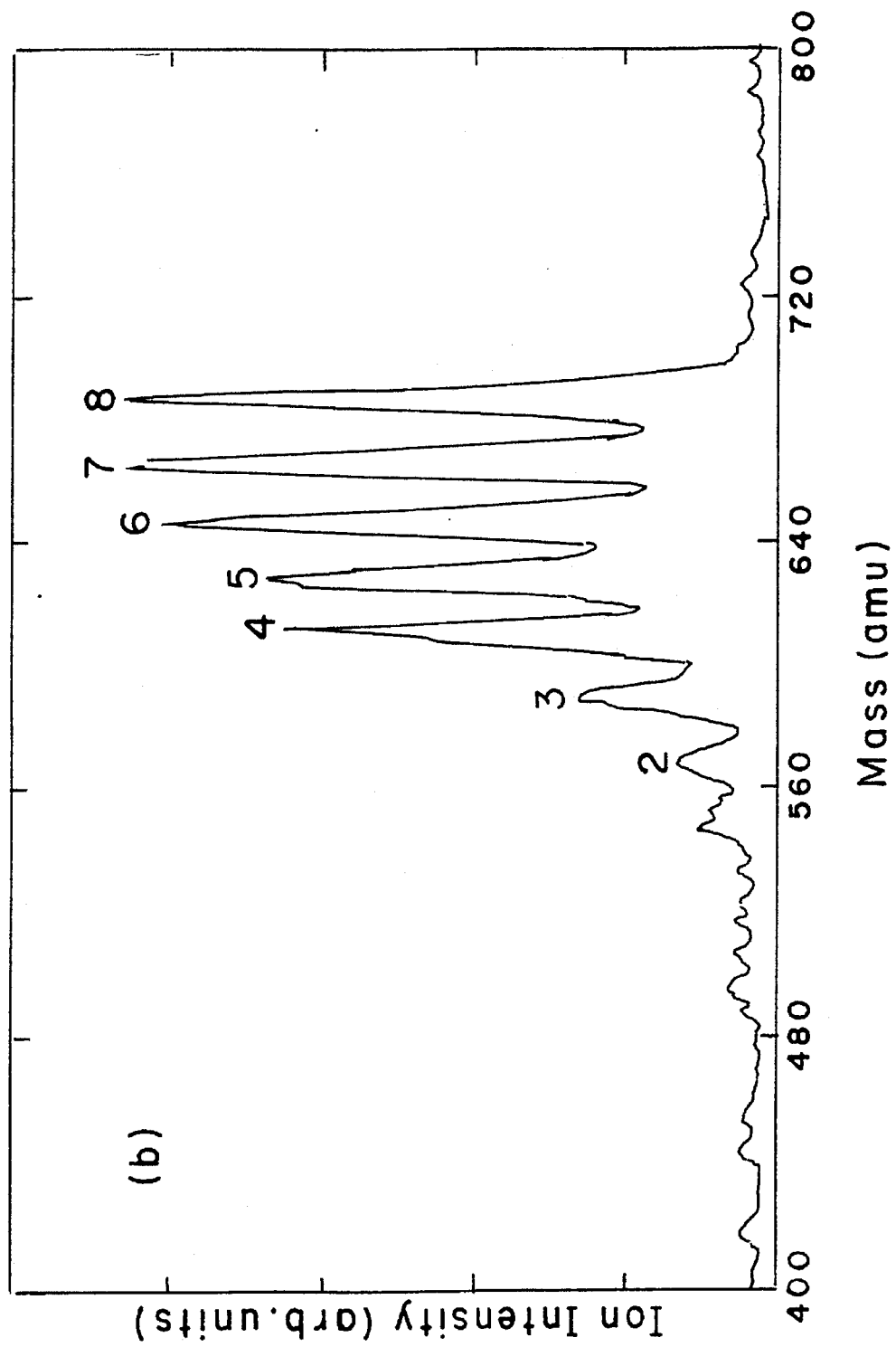
FIG. 8b is a mass spectrum of products arising from reactions of $Ti_8C_{12}^+$ with $ND_3$. The number indicates the number of $ND_3$ associating onto $Ti_8C_{12}^+$. Note that association reactions terminate at the eighth step.
Figure 9A:
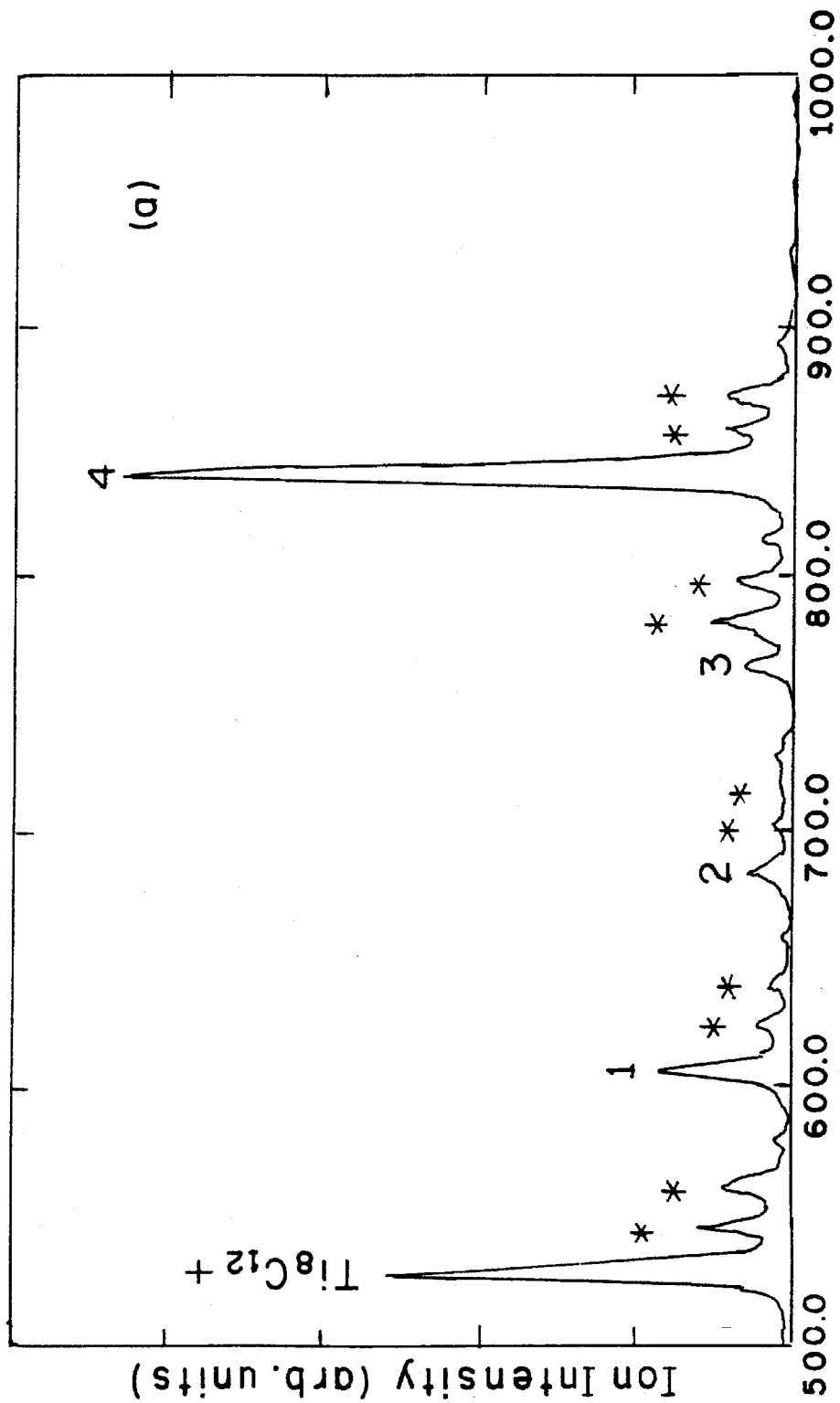
FIG. 9a is a mass spectrum of products arising from reactions of $Ti_8C_{12}^+$ with benzene obtained at very low partial pressure of benzene (0.14 m Torr).
Figure 9B:
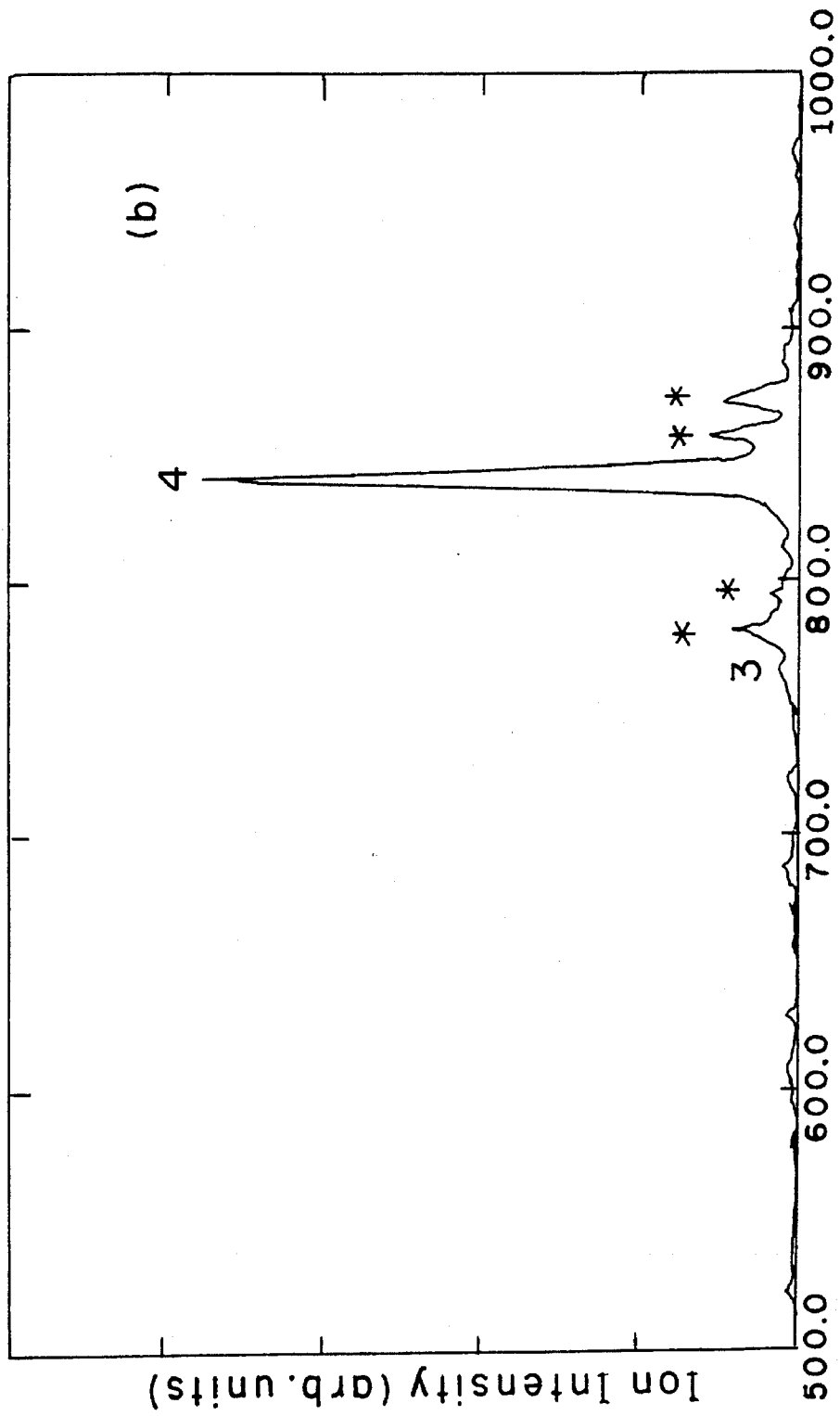
FIG. 9b is a mass spectrum of products arising from reactions of $Ti_9C_{12}^+$ obtained at much higher partial pressure of benzene. The number stands for the number of benzene associating onto $Ti_8C_{12}^+$. Note that association reactions terminate at the fourth step.

Interestingly, $Ti_8C_{12}^+$ is also quite reactive toward molecules which do not have permanent dipole moments, but do have a π-bonding system. This is evidenced by reactions which we have investigated with benzene and ethylene. For instance, FIG. 8a displays the typical product distribution from the reactions with benzene molecules at a benzene pressure of 0.14 mtorr. As in the case of methanol, aside from the major peaks labeled by an integer, there are two or three minor peaks labeled by * which are located on the right side of the major peaks. These minor peaks correspond to products containing both benzene and water molecules. Once again, the water impurities come mainly from the helium buffer gas; the products corresponding to the major peaks contain only benzenes. From the dependence of the peak intensity on the benzene partial pressure, we can estimate that its primary reaction is slower than that with polar molecules reported above. It is seen that both primary and sequential reactions with benzene and ethylene also correspond to attachment or association reactions. These attachment reactions of molecules contained π-bonding systems follow the following reaction paths:

$$Ti_8C_{12}^+(M)_{n-1} + M = Ti_8C_{12}^+(M)_n \qquad (2)$$

where M is a molecule containing a π-bonding system.

Figure 7A:
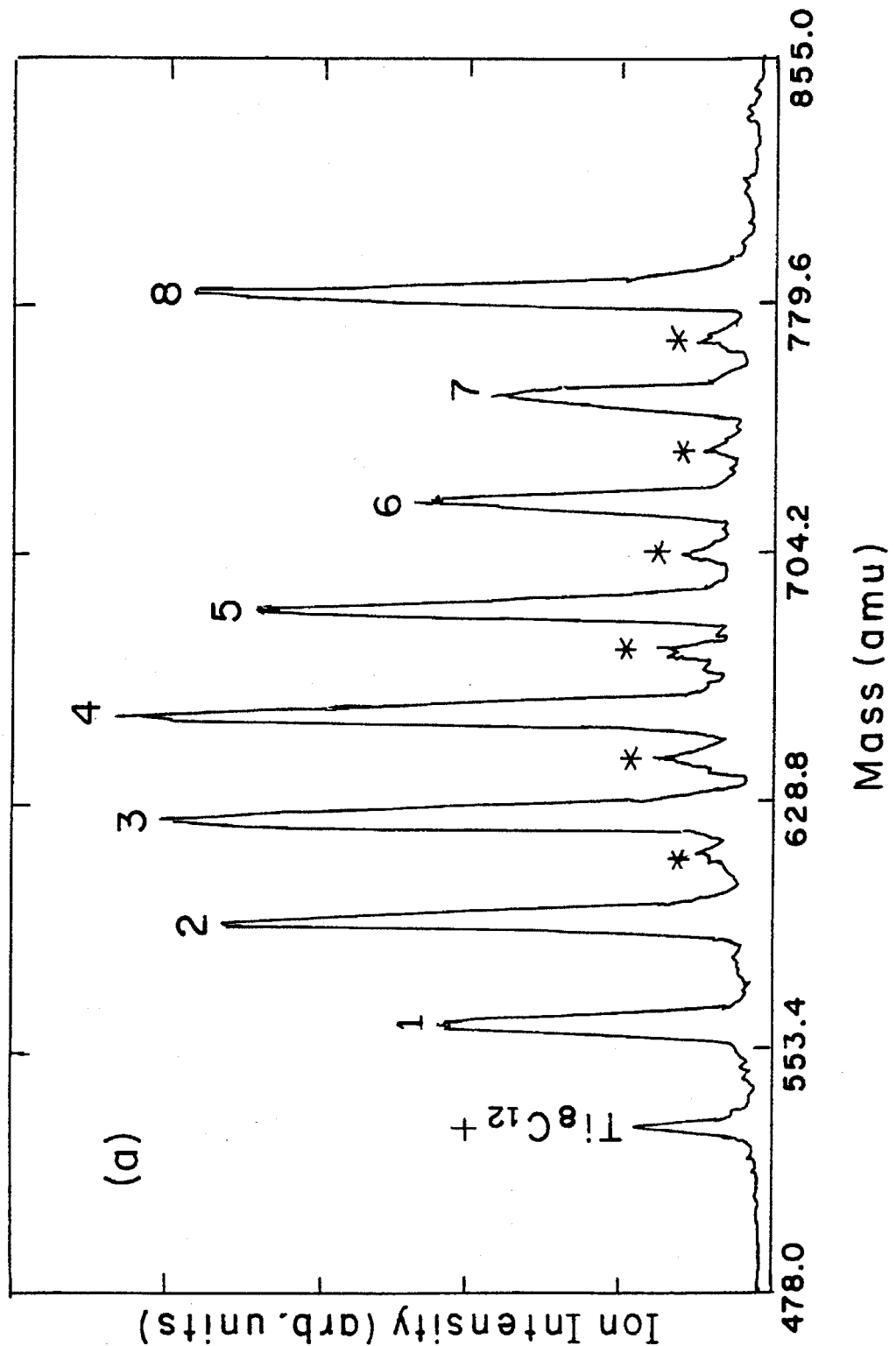
FIG. 7a is a mass spectrum of products arising from reactions of $Ti_8C_{12}^+$ with methanol, obtained at very low partial pressure of methanol.
Figure 7B:
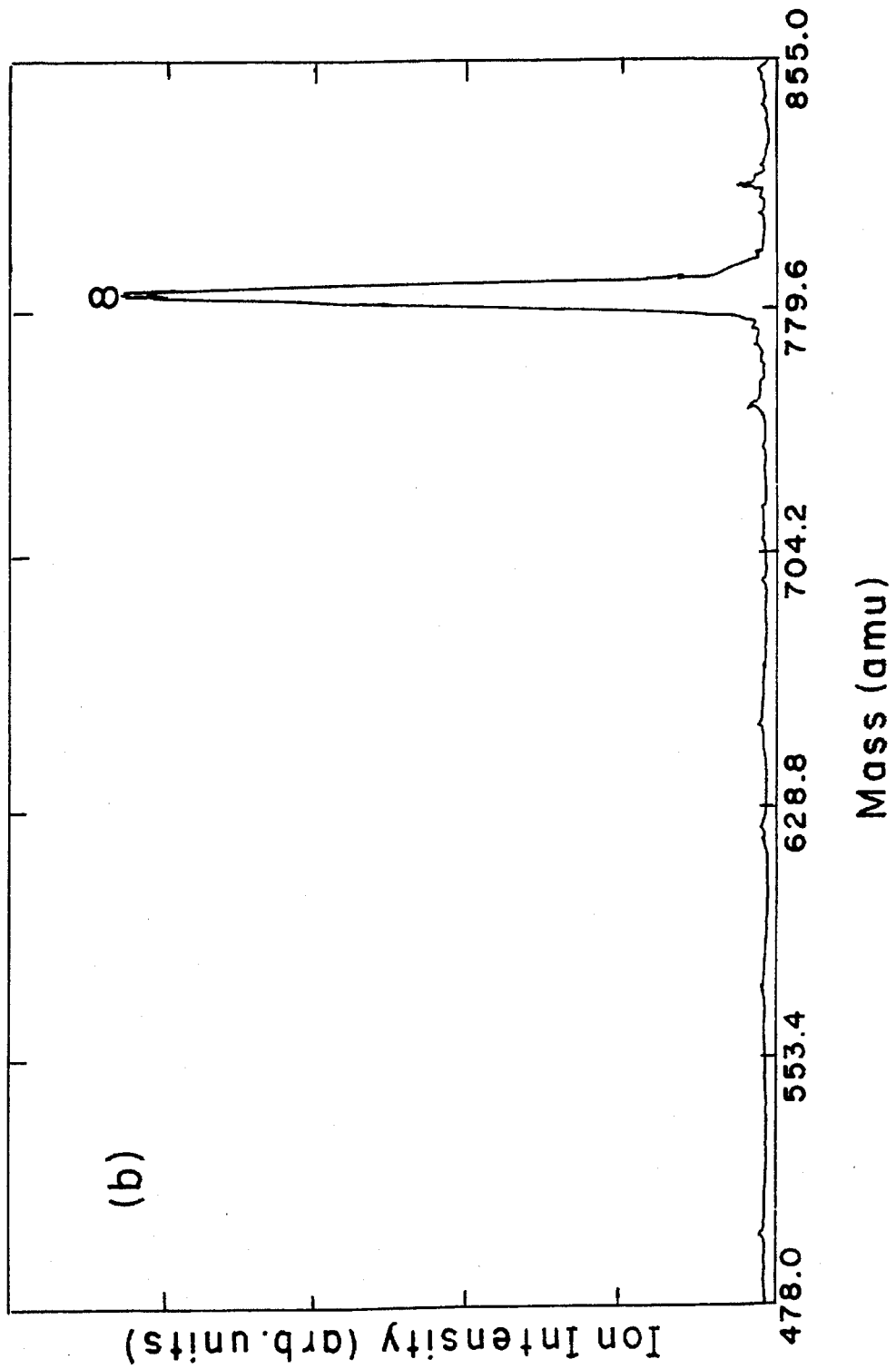
FIG. 7b is a mass spectrum of products arising from reactions of $Ti_8C_{12}$ with methanol obtained at much higher partial pressure of methanol. The number stands for the number of methanol associating onto $Ti_8C_{12}^+$. Note that association reactions terminate at the eighth step.

Surprisingly, it is seen from FIG. 7a that the reactions with benzene molecules terminate at the fourth reaction step rather than the eighth, which is different from the case of reactions with polar molecules. This suggests that only four benzenes attach in the first solvation shell of $Ti_8C_{12}^+$ at room temperature. In the same way, to verify this, we increased the partial pressure of benzene to see whether more benzenes could become accommodated to $Ti_8C_{12}^+$. FIG. 7b is the spectrum obtained at a much higher benzene partial pressure. As seen from FIG. 7b, the majority of the products in the early reaction steps were converted into the reaction products of the fourth step at much higher pressures of benzene, but the reaction still terminated at the fourth molecular addition. In the case of the reactions with ethylene, we also find that the reactions with this molecule involve attachment of ethylene onto $Ti_8C_{12}^+$, and most importantly, only four ethylene molecules can bond onto $Ti_8C_{12}^+$ at room temperature. Therefore, $n \leq 4$ in equation (2).

REACTIONS WITH OXYGEN AND METHANE

Aside from those molecules mentioned above, we also investigated the thermal energy reactions of $Ti_8C_{12}^+$ with oxygen and methane. Neither of these molecules have either permanent dipole moments or a π-bonding system. The motivation for using these reactants was to test whether $Ti_8C_{12}^+$ can undergo, besides association reactions, chemical reactions that involve breaking and forming chemical bonds. We find that unlike the reactions discussed above, $Ti_8C_{12}^+$ is inert toward the two molecules. No "real" (destructive) chemical reaction occurs as evidenced by the failure to observe any product at low pressures. Even at very high pressures of oxygen and methane (ca. 0.1 torr), only a small fraction of $Ti_8C_{12}^+$ is observed to attach oxygen or methane to form an association or addition product.

Indeed, $Ti_8C_{12}^+$ displays a unique chemical behavior. Although the titanium containing Met-Car is very reactive toward molecules with either large dipole moments or π-bonding systems, its reactions proceed mainly through associations or attachments of ligands rather than via chemical reactions involving molecular rearrangements. Even for the association of ligands, the number of ligands bonding onto $Ti_8C_{12}^+$ depends on the type of molecules involved. $Ti_8C_{12}^+$ is found to take up 8 polar molecules, while only 4 molecules with π-bonding systems are accommodated. It is also observed that this cluster ion is inert toward oxygen and methane at room temperature.

It is interesting to compare the chemistry of $Ti_8C_{12}^+$ to that of $C_{60}$. In the case of $C_{60}$, besides the fact that the $C_{60}$ cation can undergo charge transfer reactions with large organic molecules which have very low ionization potentials, it has been found that the $C_{60}$ cation is either inert or only slightly reactive toward virtually all molecules at thermal energies. The lack of the reactivity of $C_{60}$ has been attributed to its closed or edgeless ball structure.

At first glance, the experimental evidence that $Ti_8C_{12}^+$ is not only very reactive toward various molecules, but can also adsorb a number of these molecules, might be taken as evidence against the closed shell structure model proposed for Met-Cars. Because this model suggests that $Ti_8C_{12}^+$ can adopt a dodecahedral structure without dangling bonds, one would expect that this cluster should be resistant to chemical attack by virtually all molecules. However, a careful examination of the proposed structure shows that the experimental results are not in opposition to this model, but are actually supportive of it. As pointed out in the introduction section, one of major differences of $Ti_8C_{12}^+$ from $C_{60}$ is that the frame of the cage-like structure of $Ti_8C_{12}^+$ is constructed by not only carbons, but also transition metal atoms with unfilled d-shells (titaniums in the present case). The observed reactivities of $Ti_8C_{12}^+$ might just be the characteristics of a dodecahedral structure containing transition metals in its molecular framework.

Finally, it is worth briefly discussing the possible implications of the present results on the synthesis of Met-Cars in bulk quantities. Our ultimate goal is to develop Met-Cars into a new material. To achieve this goal, one has to make Met-Cars in bulk quantities. If the Met-Car $Ti_8C_{12}$ can be held together by van der Waals forces to form a crystal as in the case $C_{60}$, the present work certainly is of significance to those working on the synthesis of Met-Cars in bulk quantities. For instance, the results from the present work indicates that there is a strong interaction between polar molecules and $Ti_8C_{12}^+$. This might suggest that bulk $Ti_8C_{12}$ can be solvated by polar solvents. Considering this fact, it is expected that it might be possible to use polar solvents to extract $Ti_8C_{12}$ from samples which might contain other impurities. In addition, evidence that $Ti_8C_{12}^+$ does not undergo chemical reactions with oxygen at thermal energies (room temperature) suggests that bulk $Ti_8C_{12}$ may also be very stable in air and that samples containing Met-Cars could be handled in air.

Perspective applications for the newly discovered cage molecules open in the same fast pace, as the knowledge about them. There is prospect that they can be utilized to deliver metals to cancer cells, which may be useful in radiotherapy. Antibodies can be attached to the carbon units, and if one can insert gadolinium in place of metal, this would be a good vehicle to deliver a large number of metal atoms to a cancer site, whereby the molecules can be subjected to neutron bombardment and assist in the destruction of specific cancer calls.

The experiments and theoretical calculations done to date suggest that Met-Cars have very low ionization potentials and substantial delocalized electronic character. In view of their cage structure, one can utilize the substitution of various metals into the cage in order to alter the electronic levels and hence the electronic nature of the material. It is viewed as a very good potential for semiconductors or dopants for semiconductor materials, in areas pertaining to quantum dots or quantum wells, i.e., an alteration in the properties of semiconductors through doping. a number of theoreticians have considered the potential superconductivity properties of the Met-Cars in terms of their small cage structure, high density of electronic states near the Fermi level and their large transfer of charge from the metal to the carbon units. This suggests that they may be important as high temperature superconducting materials.

In view of their low ionization potentials and delocalized electron behavior, they are almost certain to be interesting new materials for catalyzing a variety of reactions where electron transfer plays an important role.

Thus is described our invention and the manner and process of making and using it in such full, clear, concise, and exact terms so as to enable any person skilled in the an to which is pertains, or with which it pertains, or with which it is most nearly connected, to make and use the same.

What is claimed is:

1. A metallo-carbohedrene composition having the formula $Ti_8C_{12}$.

* * * * *